United States Patent [19]

Ariga et al.

[11] 4,086,153

[45] Apr. 25, 1978

[54] METHOD OF PRODUCING A COMPOSITE COATED STEEL SHEET

[75] Inventors: Keiji Ariga, Fuchu; Nobuyuki Tsutsui; Katsumi Kanda, both of Kudamatsu, all of Japan

[73] Assignee: Toyo Kohan Co., Ltd., Tokyo, Japan

[21] Appl. No.: 736,529

[22] Filed: Oct. 28, 1976

[30] Foreign Application Priority Data

Nov. 4, 1975  Japan .................. 50-121425

[51] Int. Cl.$^2$ .................. C25D 13/06; C25D 13/10
[52] U.S. Cl. .................. 204/181 R; 204/181 C
[58] Field of Search .................. 204/181

[56] References Cited

U.S. PATENT DOCUMENTS

| | | | |
|---|---|---|---|
| 3,575,909 | 4/1971 | Gilchrist | 204/181 |
| 3,647,661 | 3/1972 | Matsushita | 204/181 |
| 3,657,092 | 4/1972 | Fischer et al. | 204/181 |
| 3,920,468 | 11/1975 | Brown et al. | 204/181 |

Primary Examiner—Howard S. Williams
Attorney, Agent, or Firm—Wenderoth, Lind & Ponack

[57] ABSTRACT

A method of providing a composite coated steel sheet is provided herein by dipping a steel sheet into a suspension solution consisting of a water-soluble and/or water-dispersible organic polymer resin, a water-dispersible sol of a metal compound and an infusible powder of a water-insoluble polymer resin, removing the coated steel sheet from the suspension and curing the coated composite by heat treatment. In certain cases, a metal powder, an alloy powder of said metal and a powder of a difficultly water-soluble or water-insoluble compound of said metal may be used in the suspension solution.

10 Claims, No Drawings

METHOD OF PRODUCING A COMPOSITE COATED STEEL SHEET

BACKGROUND OF THE INVENTION

I. Field of the Invention

The present invention relates to a method of treating steel sheets, whereby the steel sheet is electrolytically treated in a suspension solution, and then is cured by heat treatment.

The above-mentioned suspension solution consists of at least one water-dispersible sol of a metal compound, a water-soluble or water-dispersible organic polymer and an infusible powder of a polymer resin. Furthermore, the suspension solution can contain at least one powder of a metal, an alloy of said metal and a difficultly water-soluble or water-insoluble compound of the said metal.

It is an object of the present invention to produce the steel sheet coated by composite materials consisting of an organic polymer, a metal powder and/or metal compound, said product having excellent corrosion resistance because of the uniform coating with composite materials.

II. Description of the Prior Art

Conventional, well-known methods of producing a coated metal sheet, by use of a mainly polymer resin, generally, are shown as follows:

1. By the method of roller coating, knife coating, spray coating and immersion coating, the organic solvent-type paint is coated on the metal sheet and then is cured by heat treatment.
2. By the above-mentioned coating method, the mixture of polymer resin powder and adhesive solution is coated on the steel sheet, and then is cured by heat treatment.
3. By the method of injection coating, the polymer resin powder is coated on the metal sheet.
4. By the method of electrophoresis coating, the metal sheet is coated with the organic solvent containing the polymer resin powder, dried and then is cured by heat treatment.
5. By the method of electrophoresis coating, the metal sheet is coated with a treatment solution containing a water-dispersible polymer resin and then is cured by heat treatment.
6. By the method of electrostatic coating, the polymer resin powder is coated on the metal sheet, and then is cured by heat treatment.

In the above-mentioned methods of coating (1), (2) and (3), it is difficult to control the thickness or uniformity of the coating. Uniformity of the coating thickness with regard to quality control is often one of the most troubling factors. Also, for the application of a thin coating thickness, the said methods are very disadvantageous from an economical standpoint. Further, when the powders of a polymer resin and inorganic compound are used as coating materials, these methods become more and more difficult.

In the case of methods (1), (2) and (4), wherein an organic solvent is used, we often find that a public nuisance is caused by the use of such solvent.

The method of (5) requires that a strong ionic charge be produced by dissociation of the polymer resin. Therefore, the polymer resin used must be carefully chosen. For example, insoluble nylon, polyethylene and others cannot be electrodeposited by the method of (5).

The method of (6) has a weak point in that the adhesion of the resin powder is poor and the coated powder is often easily separated from the base metal sheet by a little impact or contact after production. In cases where the coating contains metal powder, the coating adhesion deteriorates further.

On the other hand, according to Japanese patent publication No. Sho 50-75623, a metal sheet is cathodically electrotreated in a suspension solution consisting of alumina sol of 1 to 500 m$\mu$ (particle diameter) with a positive electric charge and an organic polymer resin. By use of this method, one can easily control the coating thickness by the amount of electricity on treating. It is not necessary to use harmful organic solvents, therefore, a public nuisance is not caused by the treatment solution. Also, the above-mentioned insoluble nylon, polyethylene, etc. and inorganic powder can easily be electrodeposited in the suspension solution as described above.

BRIEF SUMMARY OF THE INVENTION

The present invention has been developed to improve the coating adhesion of the coated sheet according to the Japanese patent publication No. Sho 50-75623.

Namely, the present invention involves coating a steel plate with composite materials, which steel plate is electrotreated in a suspension solution consisting of a water-soluble and/or water-dispersible organic polymer resin or a water-soluble sol of a metal compound and a powder of a water-insoluble polymer resin, and in certain cases a metal powder, alloy powder of said metal and powder of a difficultly water-soluble or water-insoluble compound of said metal.

DESCRIPTION OF THE PREFERRED EMBODIMENTS

The detailed method according to the present invention will be described below.

The water-soluble or water-dispersible organic polymer resin which is one of the main components according to the present invention has the effect of improving the coating adhesion. These resins may include the following agents, i.e. phenol-type resins, alkyd-type resins, epoxy-type resins, acrylic-type resins and butadiene-type resins. The particle diameter of these resins is under 1$\mu$. A particle diameter of more than 1$\mu$ is unfavorable because it worsens the appearance of the deposit surface. A concentration in the range of 2 to 50 g/l (as solid) is suitable for improving the coating adhesion. The concentration of less than 2 g/l has little effect on improving the coating adhesion and conversely, a concentration of more than 50 g/l imparts a remarkably bad influence on the throwing power.

The water-dispersible sol may include a compound (oxide or hydroxide) of a metal such as zinc, tin, chromium, nickel, titanium, zirconium, aluminum, etc. The diameter of the sol particle is 1 to 500 m$\mu$. A concentration of the above-mentioned sol in the range of 1 to 100 g/l is suitable for the present invention. The treatment solution comprises one or more of these agents. In the case of a concentration of less than 1 g/l, the above-mentioned effects cannot be expected. At a concentration of more than 100 g/l, the improvement in film-forming is not in proportion to the increased concentration. On the contrary, it is unfavorable because the viscosity of the suspension solution tends to be high, the solution is unstable and provides a bad influence on working.

Almost any infusible powder of an organic polymer resin can be used for the suspension solution of the present invention, but it is required that the above-mentioned powder does not markedly react in the electrolytic solution.

For example, there may be used nylon, polyethylene, polypropylene, polyamides, diacryl phthalate, ethylene-vinyl acetate copolymer resins, cellulose acetate butylate, polyurethanes, polystyrol, polycarbonates, chlorovinyl resins, polyfluorovinyl resins, epoxy resins and acrylic resins. The treatment solution can contain one or more of these powder resins. The powder size tends to influence the appearance of the coating layer and coating adhesion. Small size powder forms a close deposit layer, whereas, large size powder makes for a porous deposit layer and poor coating adhesion. But these defects are improved by the treatment with a rolling press after electrodeposition or heat treatment. Therefore, although the powder size is not specifically restricted, it is desirable that it be under 200μ in order to facilitate the production of a satisfactory coating.

The concentration of powder in the treatment solution depends on the powder size, the kind of powder and the combination of materials. When the concentration is above 100g/l, some powders do not have adverse effects on the operation.

A concentration of less than 3 g/l tends to decrease the current efficiency.

For the purpose of further improving corrosion resistance, at least one powder selected from metals, alloys and a difficultly water-soluble or water-insoluble compound of the said metals are added to the above-mentioned solution.

These powders may include metals such as aluminum, zinc, chromium, cobalt, nickel, iron, tin, lead, copper, manganese, titanium, molybdenum, zirconium, bismuth, antimony and tungsten. Alloy powders include the alloys of said metals. A difficultly water-soluble or water-insoluble compound powder includes the compound of said metal such as the hydride, sulfide, chloride, oxide, sulfate, nitrate, hydroxide and carbide. The present invention can contain one or more of these powders. The suitable size (diameter) of the powder is under 200μ. A diameter of more than 200μ gives bad results such as decrease in the formation and effects of the porous coating layer and deterioration of the corrosion resistance.

The concentration of inorganic powder depends on the powder size, the kind of powder and the combination of materials, the same as described in the case of the polymer resin powder. With a concentration within 700 g/l, some powders do not produce bad effects in operation.

At a concentration of less than 3 g/l, an improved corrosion resistance cannot be expected.

A temperature of 10°–70° C is suitable for treating with the suspension solution. At a temperature of more than 70° C, it is difficult to keep the concentration of the bath constant because of high evaporation.

The current density is not especially restricted, but it must be increased in order to increase the coating thickness for a short period of time.

On electroplating, the polarity of the metal sheet treated depends upon the composition of the suspension solution. In general, when the pH of the treatment solution is on the acid side, the metal is cathodically treated. On the other hand, when the pH of the solution is on the alkaline side, the metal sheet is anodically treated.

Agitation on electrotreatment has a tendency to decrease the deposit efficiency, but some agitation is required in order to uniformly maintain the powder in the suspension solution.

Surface active agents or alcohol may also be added to the treatment solution in order to uniformly disperse the powder in the treatment solution. For example, nylon powder (diameter:50μ) can uniformly and quickly be mixed by the addition of 1 g/l of an alkyl betaine-type surface active agent.

After preparing the suspension solution by the above-mentioned method, the metal sheet is cathodically or anodically treated in said suspension solution.

The electrodeposited layer formed on the metal sheet can be rinsed with water and then dried.

The coated metal sheet formed by the above-mentioned method is cured by heat treatment. The conditions of the heat treatment depend on the kind of powder and coating thickness. As a temporary standard, it requires that the resin powder be in a molten state. Also, before or after curing, a pressure rolling treatment remarkably improves the appearance of the coated sheet.

The present invention is applicable for the surface treatment of various metal sheets and metal forming part products. For example, steel sheets, chromic electrotreatment steel sheets, chromium, tin, zinc, nickel, aluminum and other metal plated steel sheets or alloy plated steel sheets of said metal. Also, the present invention is applicable to those steel sheets with a post treatment such as with a chromate, phosphate and so forth.

The detailed effects of the present invention will now be explained taking into account the following practical, non-limitative examples.

EXAMPLE 1

A low carbon steel sheet of 0.5 mm thickness, after annealing and temper rolling, was cleaned in 70 g/l of sodium hydroxide solution at a temperature of 70° C for 10 seconds, rinsed with water and then placed in 70 g/l of sulfuric acid for 5 seconds at 20° C and again rinsed with water. The pre-treated steel sheet was immediately treated by the method of the present invention.

Treatment of the present invention:

| Bath composition | | |
|---|---|---|
| hydroxide sol of chromium | (average diameter of particles:100mμ | 35 g/l |
| epoxy powder | (average diameter:40μ) | 10 g/l |
| polyacrylamide | (water-soluble resin) | 10 g/l |
| Temperature | | 20° C |
| Current density | (cathodic treatment) | 5 A/dm$^2$ |
| Plating time | | 15 seconds |

The coated metal sheet formed was blue. The said coated sheet was heated for 2 minutes at a temperature of 250° C and the light blue coated steel sheet of 14μ thickness was obtained. An Erichsen test indicated an 8 mm depth. The coated sheet showed no evidence of adhesion loss of the coated layer. Also, the corrosion test (salt spray test) provided by JIS (Japanese Industrial Standard) Z 2371 was applied to said coated sheet and the coated sheet did not show any red rust after 200 hours.

On the other hand, in the case where a polyacrylamide was not added, a red rust was observed after 200 hours in the salt spray test. A steel sheet coated with epoxy powder by the conventional method of spray coating made interface adhesion worse between the powder and base metal and the powder was separated from the base metal by a little impact. The epoxy powder was baked carefully so as to not separate from the base metal. The coated sheet obtained showed red rust after 10 hours.

EXAMPLE II

The same low carbon steel sheet was subjected to the same pre-treatment described in Example I. After that, the said pre-treated sheet was immediately treated by the method of the present invention.

Treatment of the present invention:

| Bath composition | | |
|---|---|---|
| hydroxide sol of chromium | (average diameter of particles:100mµ | 35 g/l |
| epoxy powder | (average diameter:40µ) | 10 g/l |
| polyacrylamide | (water-soluble resin) | 10 g/l |
| zinc powder | (diameter:100µ) | 100 g/l |
| Temperature | | 20° C |
| Current density | (cathodic treatment) | 5 A/dm² |
| Plating time | | 15 seconds |

The coated sheet formed was gray. The said coated sheet was heated for 2 minutes at a temperature of 250° C and a gray coated sheet of 14µ thickness was obtained.

The Erichsen test showed an 8 mm depth and the coated sheet showed no evidence of adhesion loss of the coating layer. Also, the coated sheet was evaluated by the salt spray test as described in Example I. The results shows that no red rust was observed after 500 hours and the addition of zinc powder was effective for improving the properties described above.

On the other hand, the steel sheet coated with epoxy powder only by the conventional method of spray coating had inferior interface adhesion between the powder and base metal. The epoxy powder was baked carefully so as not to separate from the base steel. The coated sheet obtained showed a red rust after 24 hours.

EXAMPLE III

The same low carbon steel sheet as described in Example I was electrogalvanized (weight of deposit:10 g/m²), and then treated by a chromate method. It was then treated as follows:

Treatment of the present invention:

| Bath composition | |
|---|---|
| butadiene-type water soluble resin | 20 g/l |
| epoxy powder (average diameter:40µ) | 10 g/l |
| zinc powder (average diameter:100µ) | 100 g/l |
| Temperature | 20° C |
| Current density (anodic treatment) | 5 A/dm² |
| Plating time | 15 seconds |

The coated sheet formed was gray. The said coated sheet was baked for 30 seconds at a temperature of 400° C. The results obtained showed that the gray coated sheet had a thickness of 20µ.

The coated sheet was evaluated by the coating adhesion and corrosion resistance tests described in Example II. The results shows excellent properties as described in Example II.

What is claimed is

1. A method of producing a composite coated steel sheet which comprises electrolytically treating a steel sheet in a suspension solution consisting essentially of a water-soluble resin or a water-dispersible resin; a water-dispersible sol of a metal compound and an infusible organic polymer resin powder, removing the coated steel sheet from the suspension solution and then curing the coated steel sheet by heat treatment.

2. The method of claim 1, wherein the water-soluble resin and water-dispersible resin are selected from the group consisting of epoxy resins, phenol resins, alkyl resins, acryl resins and butadiene resins which are added to the suspension solution as a solid in an amount from about 2 to 50 g/l.

3. The method of claim 1, wherein the sol is an inorganic compound selected from the group consisting of an oxide or hydroxide of nickel, titanium, chromium, zinc, aluminum and tin having an average particle size of about 1 to 500 mµ, which sol is added to said suspension solution in an amount from about 1 to 100 g/l.

4. The method of claim 1, wherein the infusible organic polymer resin powder is selected from nylon, polyethylene, polypropylene, polyamides, diacrylphthalate, ethylene-vinyl acetate copolymer resins, cellulose acetate butylate, polyurethanes, polystyrol, polycarbonates, chlorovinyl resins, polyfluorovinyl resins, epoxy resins or acrylic resins, which resins have an average particle diameter of under 200µ.

5. The method of claim 1, wherein the water-soluble or water-dispersible resins are selected from the group consisting of epoxy resins, phenol resins, alkyl resins, acryl resins and butadiene resins present in the suspension solution in an amount of 2 to 50 g/l; the sol is an inorganic compound selected from the group consisting of an oxide or hydroxide of nickel, titanium, chromium, zinc, aluminum and tin having an average particle size of about 1 to 500 mµ, said sol being present in the suspension solution in an amount from 1 to 100 g/l; the infusible organic polymer resin powder is selected from nylon, polyethylene, polypropylene, polyamides, diacrylphthalate, ethylene-vinyl acetate copolymer resins, cellulose acetate butylate, polyurethanes, polystyrol, polycarbonates, chlorovinyl resins, polyfluorovinyl resins, epoxy resins or acrylic resins, which resins have an average particle diameter of under 200µ in a concentration ranging from 3 g/l to 100 g/l.

6. A method of producing a composite coated steel sheet which comprises electrolytically treating a steel sheet in a suspension solution consisting essentially of at least one water-soluble resin or a water-dispersible resin; a water-dispersible sol of a metal compound and an infusible organic polymer resin powder, and at least one member selected from the group consisting of a metal powder, an alloy powder of said metal or a powder of a difficultly water-soluble or water-insoluble compound of said metal, removing the coated metal sheet from the suspension and then curing the coated metal sheet by heat treatment.

7. The method of claim 6, wherein the infusible organic polymer resin powder is selected from nylon, polyethylene, polypropylene, polyamides, diacrylphthalate, ethylene-vinyl acetate copolymer resins, cellulose acetate butylate, polyurethanes, polystyrol, polycarbonates, chlorovinyl resins, polyfluorovinyl resins, epoxy resins or acrylic resins, which resins have an average particle diameter of under 200µ.

8. The method of claim 6, wherein the metal powder is selected from aluminum, zinc, chromium, cobalt, iron, nickel, tin, lead, copper, manganese, titanium, molybdenum, zirconium, bismuth, antimony or tungsten, said metal having an average particle diameter of under 200μ.

9. The method of claim 6, wherein the alloy powder is an alloy of the metal selected from aluminum, zinc, chromium, cobalt, nickel, iron, tin, lead, copper, manganese, titanium, molybdenum, zirconium, bismuth, antimony or tungsten, said metal having an average particle diameter of under 200μ.

10. The method of claim 6, wherein the water-soluble and water-dispersible resins are selected from the group consisting of epoxy resins, phenol resins, alkyl resins, acryl resins and butadiene resins present in the suspension solution in an amount of 2 to 50 g/l; the sol is an inorganic compound selected from the group consisting of an oxide or hydroxide of nickel, titanium, chromium, zinc, aluminum and tin having an average particle size of about 1 to 500 mμ, said sol being present in the suspension solution in an amount of from 1 to 100 g/l; the infusible organic polymer resin powder is selected from nylon, polyethylene, polypropylene, polyamides, diacrylphthalate, ethylene-vinyl acetate copolymer resins, cellulose acetate butylate, polyurethanes, polystyrol, polycarbonates, chlorovinyl resins, polyfluorovinyl resins, epoxy resins or acrylic resins, which resins have an average particle diameter of under 200μ in a concentration ranging from 3 g/l to 100 g/l; the metal powder is selected from aluminum, zinc, chromium, cobalt, nickel, iron, tin, lead, copper, manganese, titanium, molybdenum, zirconium, bismuth, antimony or tungsten; the alloy powder is selected from alloys of the metals of aluminum, zinc, chromium, cobalt, nickel, iron, tin, lead, copper, manganese, titanium, molybdenum, zirconium, bismuth, antimony or tungsten, and the difficultly water-soluble or water-insoluble compound powder is a compound of a metal selected from aluminum, zinc, chromium, cobalt, nickel, iron, tin, lead, copper, manganese, titanium, molybdenum, zirconium, bismuth, antimony or tungsten; said metal powders, alloy powder and difficultly water-soluble or water-insoluble components having an average particle diameter of under 200μ and being present in the suspension solution in amounts ranging from 3 g/l to 700 g/l.

* * * * *